SUBSCRIBER TELEVISION SYSTEM

Filed Sept. 18, 1952 9 Sheets-Sheet 1

INVENTOR:
ALEXANDER ELLETT
BY Francis W. Crotty
HIS ATTORNEY.

ALEXANDER ELLETT
*INVENTOR.*
BY Francis W. Crotty
HIS ATTORNEY.

INVENTOR:
ALEXANDER ELLETT
BY Francis W. Crotty
HIS ATTORNEY.

INVENTOR:
ALEXANDER ELLETT
BY Francis W. Crotty
HIS ATTORNEY.

*INVENTOR:*
ALEXANDER ELLETT
*BY* Francis W. Crotty
HIS ATTORNEY.

INVENTOR:
ALEXANDER ELLETT
BY Francis W. Crotty
HIS ATTORNEY.

INVENTOR:
ALEXANDER ELLETT
BY Francis W. Crotty
HIS ATTORNEY.

INVENTOR:
ALEXANDER ELLETT
BY Francis W. Crotty
HIS ATTORNEY.

Sept. 10, 1963 A. ELLETT 3,103,550

SUBSCRIBER TELEVISION SYSTEM

Filed Sept. 18, 1952 9 Sheets-Sheet 9

INVENTOR:
ALEXANDER ELLETT
BY Francis W. Crotty
HIS ATTORNEY.

United States Patent Office 3,103,550
Patented Sept. 10, 1963

3,103,550
SUBSCRIBER TELEVISION SYSTEM

Alexander Ellett, River Forest, Ill., assignor to Zenith Radio Corporation, a corporation of Delaware Filed Sept. 18, 1952, Ser. No. 310,309
19 Claims. (Cl. 178—5.1)

Figure 1:
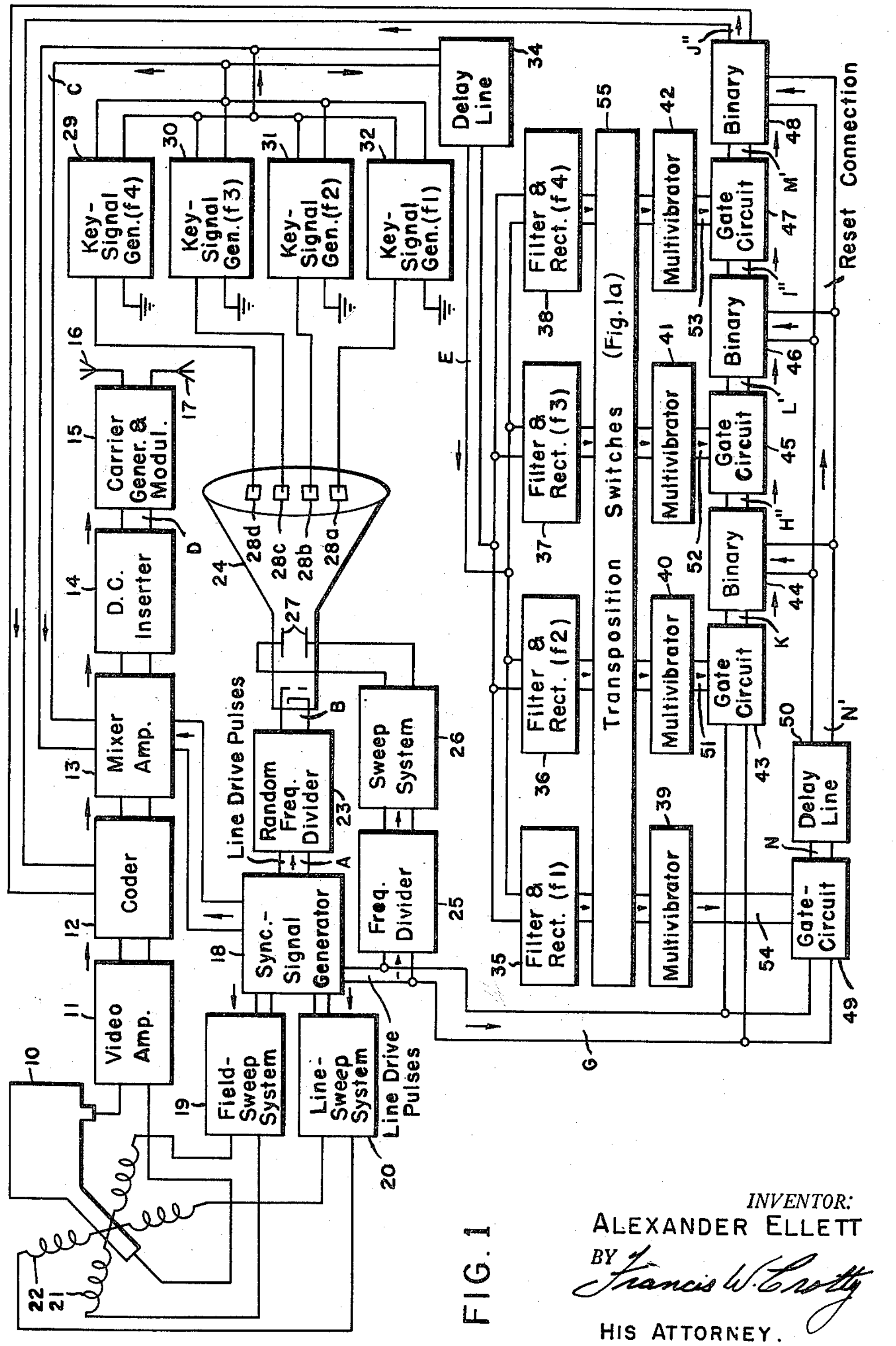

This invention relates to subscription television systems in which a television signal is distributed in coded form for use only in subscriber receivers having appropriate decoding apparatus actuated in accordance with the coding schedule of the telecast.

Subscription television systems, as such, are already known in the art, being disclosed and claimed for example in Patent 2,510,046 to Ellett et al. and in Patent 2,547,598 to Roschke, both of which are assigned to the present assignee. In these prior systems, coding is accomplished by altering some characteristic of the television signal during spaced intervals which may, for example, have a duration corresponding to several field-trace intervals and which may have a time separation also corresponding to one or more field-trace intervals.

In one embodiment of the Roschke system the relative timing of the video and synchronizing components of the television signal is altered during spaced operating intervals and a key signal is distributed to the subscriber receivers to identify the actual times of occurrence of such intervals. Where such signal alterations take place after one or more field intervals, the coding process may be characterized as occurring at a "slower-than-field" rate. It is desirable in certain applications to employ "faster-than-field" coding, that is, coding in which the alterations of the subscription signal occur at a faster-than-field rate. This has the advantage of increasing the coding complexity and reducing the possibility of unauthorized deciphering and utilization of the telecast.

The present invention is especially directed to an improved type of subscription television system characterized by faster-than-field coding and arranged for such flexibility as to render pirating or unauthorized use of the subscription telecast exceedingly difficult. The system further features, in its preferred form, random coding which is most effective protection against pirating. Since the invention may be practiced in either a transmitter or a receiver, the term "encoding" is used herein in its generic sense to encompass either coding at the transmitter or decoding at the receiver.

It is, accordingly, an object of the present invention to provide a new and improved subscription television system in which the coding schedule exhibits a high degree of complexity.

A further object of the invention is to provide such an improved system in which mode changes of the transmitted television signal occur at a relatively high, faster-than-field, rate to render unauthorized decoding extremely difficult.

A still further object of the invention is to provide an improved subscription television system employing faster-than-field coding and in which precise registration is maintained between the encoding apparatus at the transmitter and at the various receivers even though the coding may proceed in accordance with a random schedule.

Another object of the invention is to provide improved encoding apparatus for use at the transmitter or receiver of a subscription television system for achieving faster-than-field coding.

An encoding arrangement constructed in accordance with the present invention comprises an encoding device having at least two operating conditions each of which establishes a different operating mode in the system effectively to encode the television signal. A pulse-counting mechanism coupled to the encoding device is responsive to the registration of a predetermined pulse count to effect an actuation of the encoding device from one to another of its aforesaid operating conditions. A pulse-signal source is coupled to the counting mechanism for applying thereto a series of input pulses to be counted thereby, and means is provided for resetting the counting mechanism to a reference condition. Control apparatus is associated with the counting mechanism for varying the count thereof. Means is included for providing a control effect representing a predetermined code schedule, and means is also provided for utilizing the control effect to actuate the control apparatus in accordance with the predetermined code schedule. This encoding arrangement may be employed in either the transmitter or receiver.

In accordance with another aspect of the invention, a multistable actuating device is coupled to the encoding device and has a plurality of stable operating conditions, at least some of which are effective to estabilsh the encoding device in assigned ones of its operating conditions. There are at least two input circuits included in the actuating device which are individually differently responsive to an actuating signal to operate the actuating device from one to another of its stable operating conditions. Means are provided for deriving a combination of randomly occurring encoding signal components individually having a predetermined different identifying frequency and collectively determining a code schedule. Means are coupled to the deriving means and to the input circuits for utilizing the encoding signal components to control the application of actuating signals to the input circuits for effecting actuation of the actuating device between its stable operating conditions to vary the operating condition of the encoding device.

According to a further aspect of the invention, a television receiving system is provided which includes a receiving channel adapted to demodulate and deliver at respective output terminals a first series of driving signal components and a second series of reset signal components, the components of at least one of the series comprising signal bursts of a predetermined identifying frequency. There is an electrical counting circuit having a count indicating output terminal which conditionally delivers an electrical signal upon the attaining of predetermined counts in the counting circuit. The counting circuit also has a driving signal input terminal and a reset signal input terminal. Signal coupling means are connected from the driving signal and reset signal output terminals to the driving signal and reset signal input terminals, respectively. The receiving system also includes decoding apparatus and signal coupling means connected from the count indicating output terminal to the decoding apparatus to control the operation thereof.

Figure 1A:
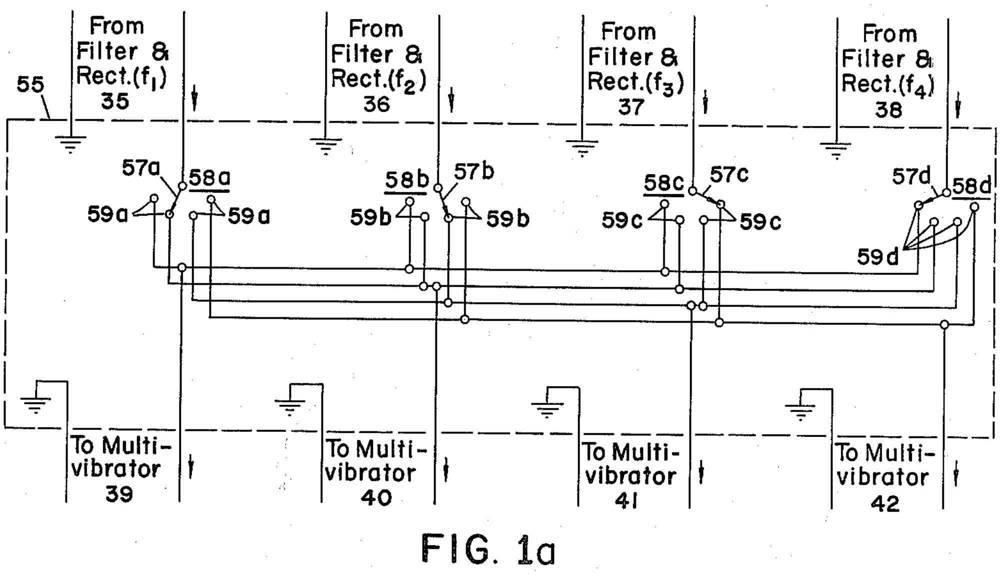
Figure 2:
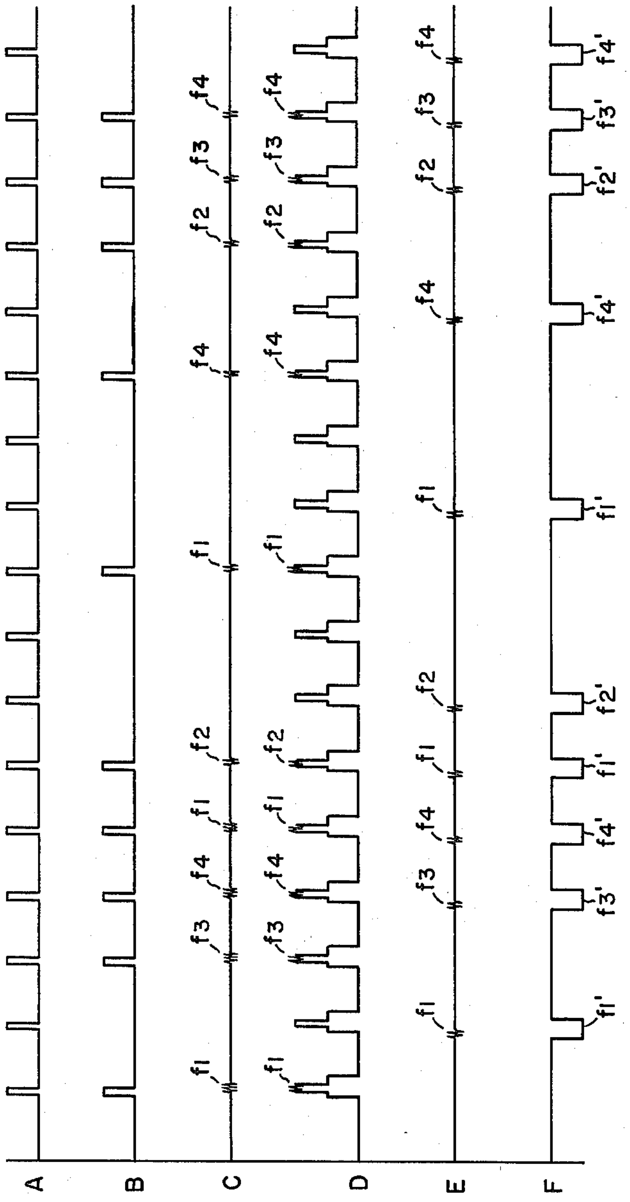
Figure 3:
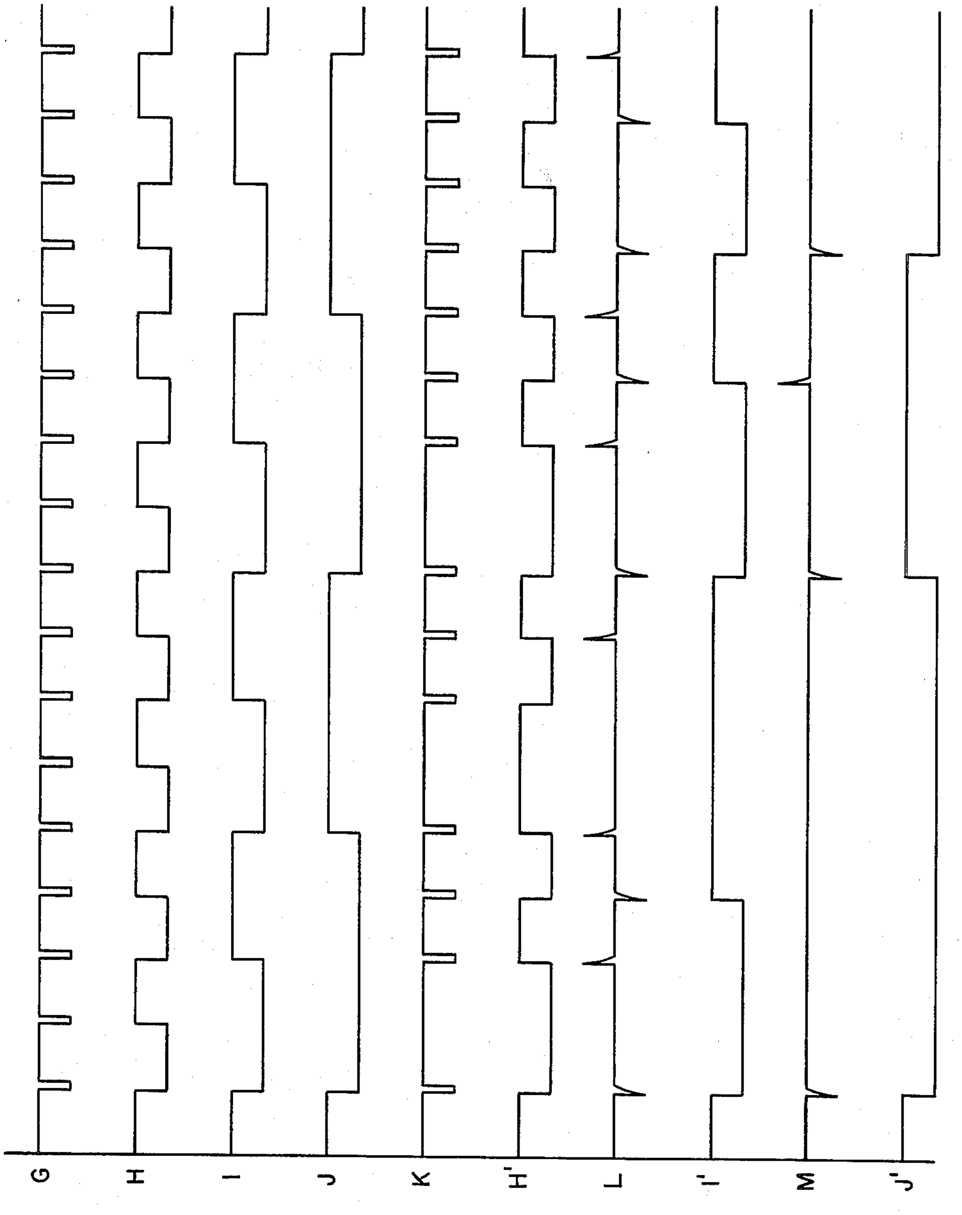
Figure 4:
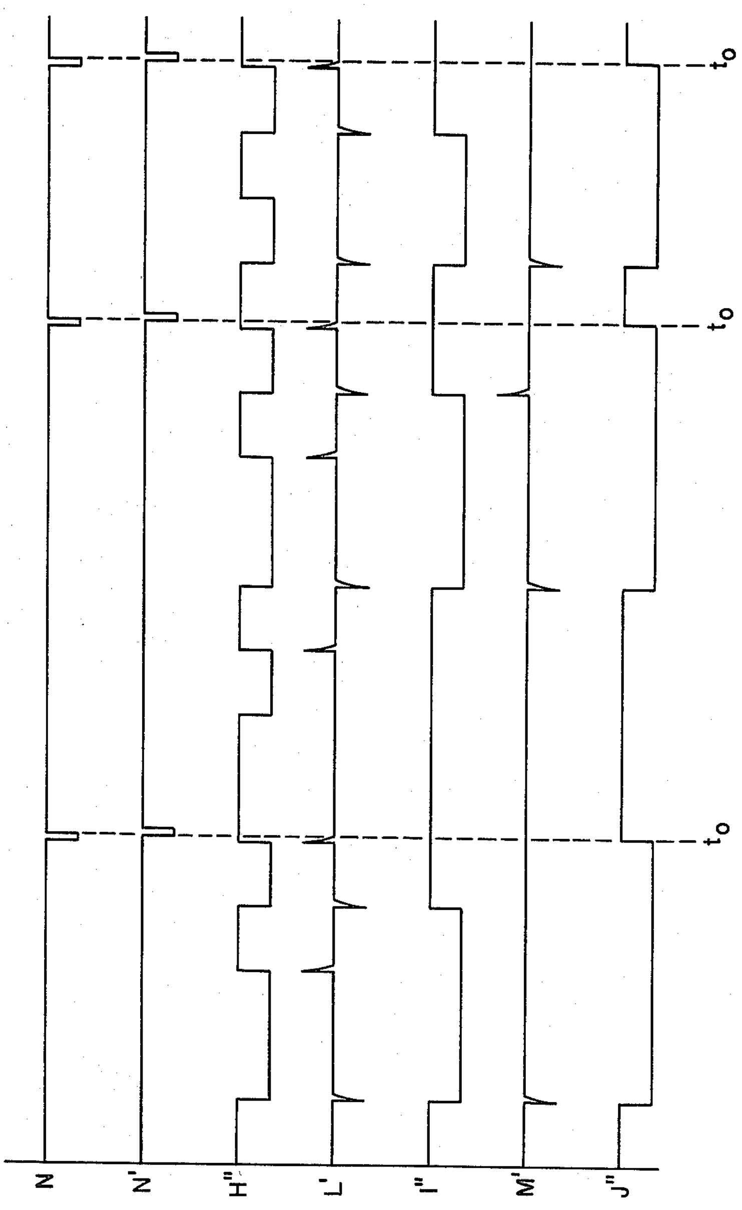
Figure 5:
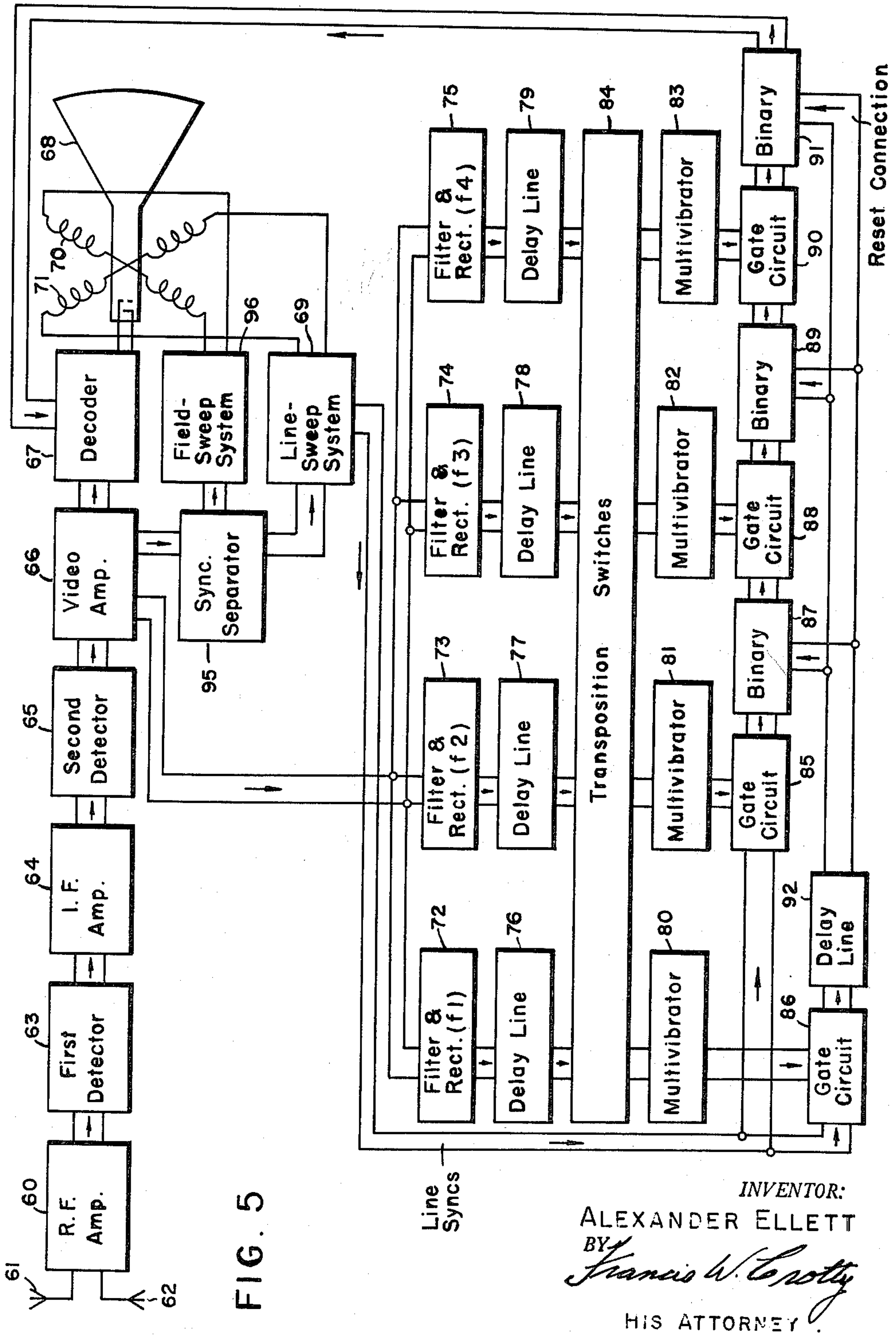
Figure 6:
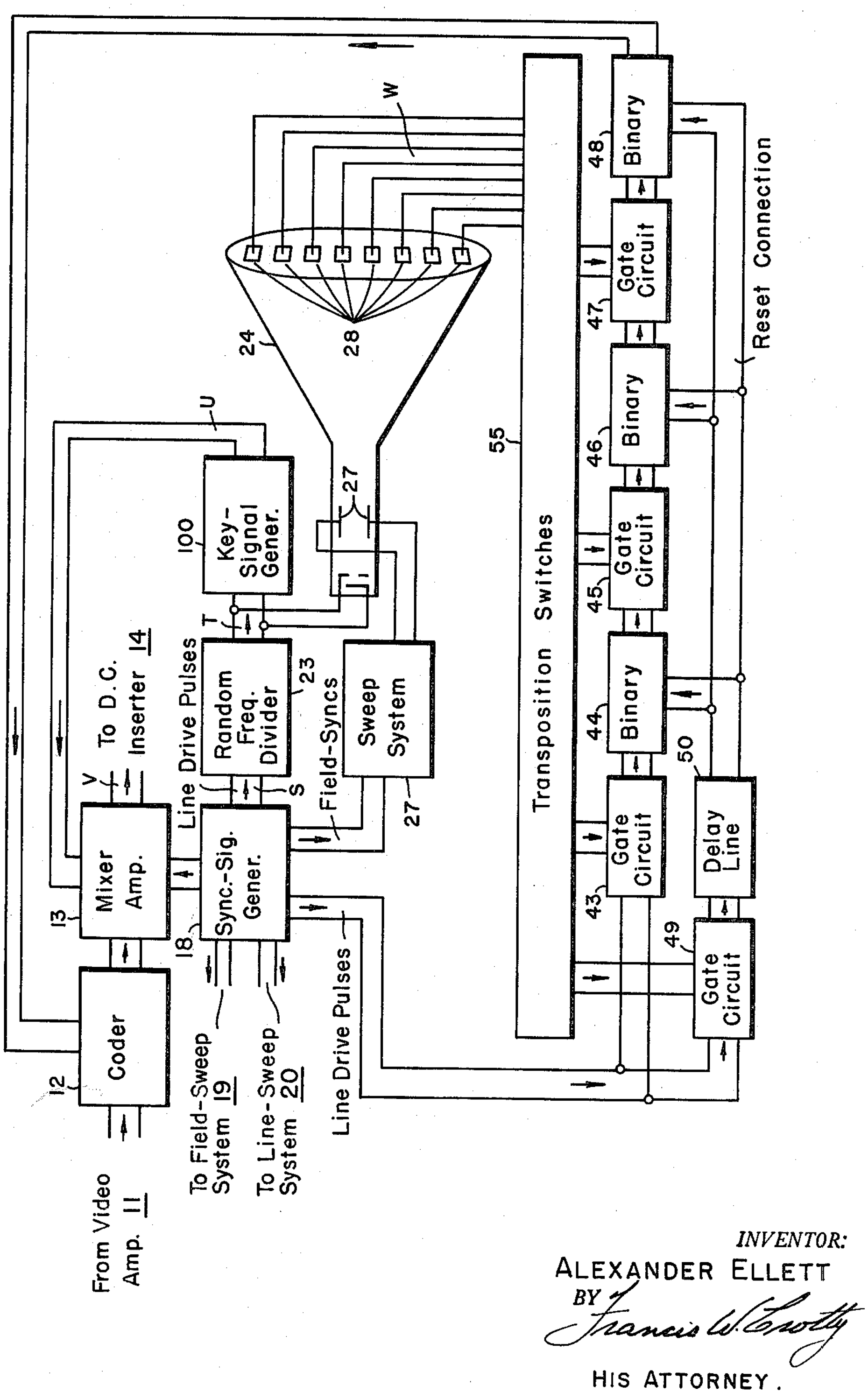
Figure 7:
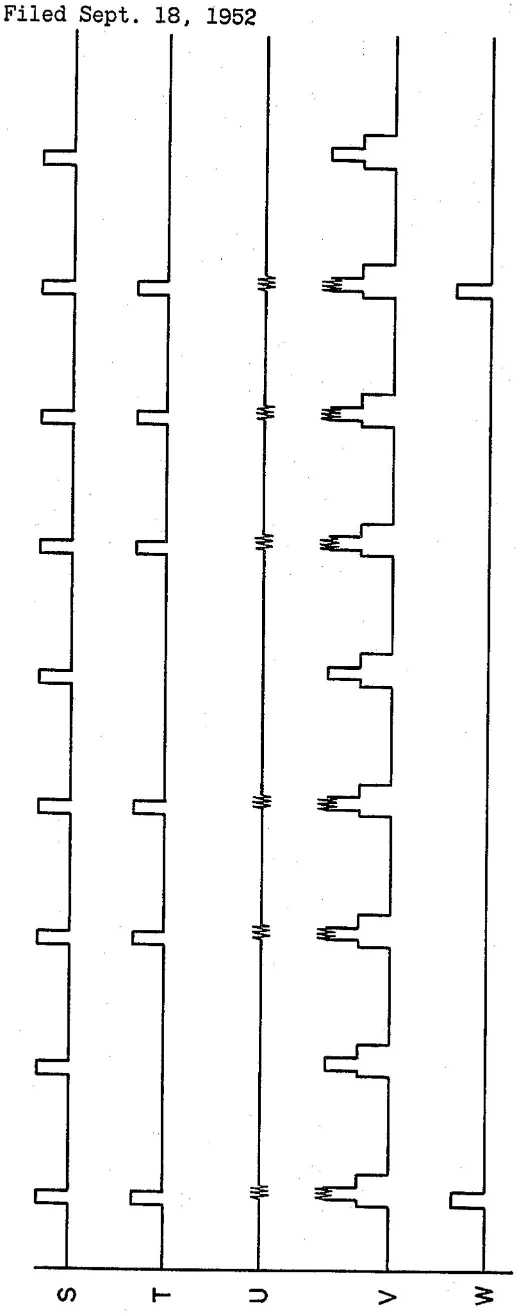
Figure 8:
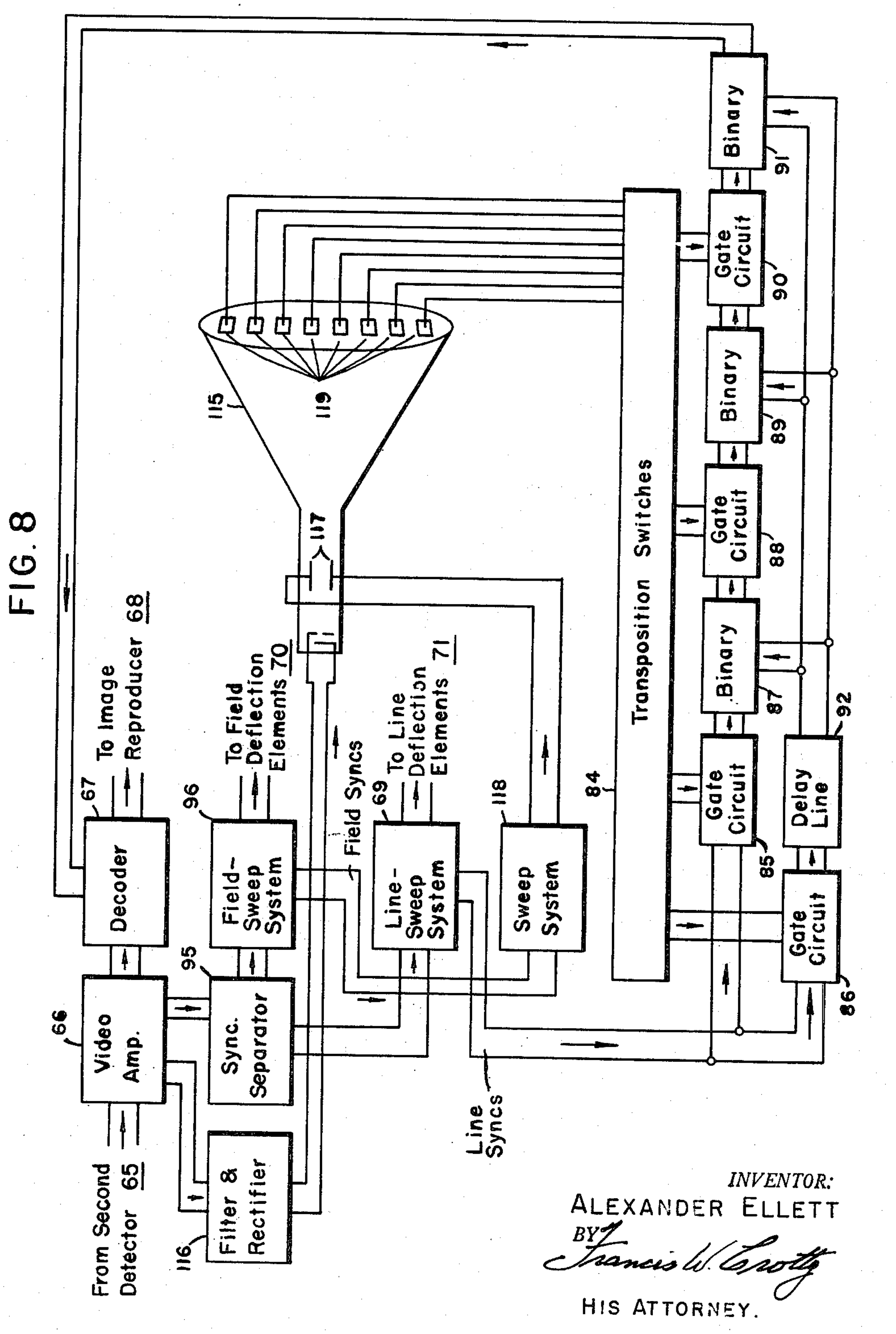

The features of this invention which are believed to be new are set forth with particularity in the appended claims. The invention, however, together with further objects and advantages thereof, may best be understood by reference to the following description in conjunction with the accompanying drawings, in which:

FIGURE 1 represents a subscription television transmitter constructed in accordance with the invention, FIGURE 1*a* represents a portion of the transmitter of FIGURE 1, FIGURES 2, 3 and 4 comprise a family of curves used in explaining the operation of the transmitter of FIGURE 1, FIGURE 5 represents a subscription television receiver for operation in conjunction with the transmitter of FIGURE 1, FIGURE 6 shows a modification of a portion of the transmitter of FIGURE 1, FIGURE 7 comprises various curves used in explaining the operation of the arrangement of FIGURE 6, and, FIGURE 8 shows a modification of a portion of the receiver of FIGURE 5 to enable that receiver to operate in conjunction with the transmitter modification of FIGURE 6.

The transmitter of FIGURE 1 includes a picture-converting device 10 which may be an iconoscope, image-orthicon or any other well-known type of cathode-ray video-signal generator. The output terminals of device 10 are connected through a video amplifier 11 and a coder 12, described more particularly hereinafter, to a mixer amplifier 13 which, in turn, is connected through a direct-current inserter 14 to a carrier-wave generator and modulator 15, the latter having output terminals connected to an appropriate antenna 16, 17. The coder may be constructed in accordance with the teachings of copending application Serial No. 243,039 of Robert Adler, filed August 22, 1951, and issued August 7, 1956, as Patent 2,758,153, entitled "Subscription Television System" and assigned to the present assignee.

The transmitter also includes a synchronizing-signal generator 18 which produces line- and field-synchronizing components and associated pedestal components for application to the mixer amplifier. Generator 18 further produces field- and line-drive pulses which are applied respectively to a field-sweep system 19 and to a line-sweep system 20. The output terminals of sweep systems 19 and 20 are connected to the field-deflection elements 21 and the line-deflection elements 22 of picture-converting device 10.

Generator 18 additionally supplies line-drive pulses to a random-frequency divider 23, which may be constructed in the manner of Patent 2,588,413, issued March 11, 1952, to E. M. Roschke and assigned to the present assignee. The output terminals of the divider are connected to the input electrodes of a cathode-ray commutator 24. Generator 18 also supplies line-drive pulses through another frequency divider 25 to another sweep system 26 having output terminals connected to the deflection elements 27 of commutator 24. The commutator has a series of segmental anode electrodes **28*a*–28*d* which are individually connected to an assigned one of a corresponding series of key-signal generators 29–32, individually constructed to generate a key signal of a distinctive frequency when actuated by a pulse from commutator 24. The output terminals of the key-signal generators are connected together and to mixer amplifier 13**.

The output terminals of key-signal generators 29–32 are also connected through a delay line 34 to a series of filter and rectifier units 35–38 individually selective to the operating frequency of an assigned one of the key-signal generators. The output terminals of units 35–38 are respectively connected to a series of multivibrators 39–42 through a series of transposition switches shown generally by the block 55. This manual switching arrangement may employ any well known devices to permit connection of each separate filter and rectifier to any one of the four multivibrators 39–42. For example, as illustrated in FIGURE 1*a*, the rectifiers may be permanently connected to the respective movable taps **57*a*–57*d* of four-position switches 58*a*–58*d* whose fixed contacts 59*a*–59*d* are individually connected to one of the four multivibrators 39–42** so that any one of the multivibrators may be connected thereto.

Generator 18 further supplies line-drive pulses to a normally open gate circuit 43 which is connected to a binary counter 44 of well-known construction. The counter is connected through another normally open gate circuit 45 to another binary counter 46. Binary counter 46 is likewise connected through a normally open gate circuit 47 to a third binary counter 48, having output terminals connected to coder 12. Differentiating input circuits are provided for gate circuits 45 and 47, and phase inverters (not shown) may be interposed between gate circuits 43, 45 and 47 and binary counters 44, 46 and 48 respectively to insure the desired polarity relations. For convenience it will be assumed that each binary responds to and is actuated by the negative excursion of an applied pulse or, where the pulse is applied through a differentiating network, the transient derived from the negative excursion of that pulse actuates the binary. Generator 18 additionally supplies line-drive pulses to a normally closed gate circuit 49 which is connected through a delay line 50 and optionally through a phase inverter (not shown) to binary counters 44, 46 and 48 to supply reset pulses to the counters. Multivibrators 39–42 are respectively connected to the gate circuits 49, 43, 45 and 47 by leads 54, 51, 52 and 53.

In operation, picture-converting device 10 produces video-frequency components representing the program information to be televised, and these components after amplification in video-amplifier 11 are supplied through coder 12 to mixer 13. The video-frequency components are mixed with line- and field-synchronizing and pedestal components in unit 13 to produce a television signal that is appropriately adjusted as to background level in D.C. inserter 14 and modulated on a picture carrier in unit 15 for radiation to subscriber receivers from antenna 16, 17. Coder 12, as disclosed in the aforementioned Adler application, may comprise a beam-deflection tube having a pair of output circuits which may be selectively coupled into the video channel as the beam is deflected from one to the other of two segmental anodes coupled to such output circuits. One of these circuits includes a time-delay network so that the timing of the video components relative to the synchronizing components varies as the beam of the deflection tube is switched between its anodes. This switching effect is accomplished by means of a beam-deflection control or actuating signal applied to coder 12, as explained hereinafter. Such intermittent variations in the timing of the video components effectively codes the television signal since conventional television receivers, not equipped with suitable decoding apparatus, depend upon an invariable time relation of the video and synchronizing components of a received signal to reproduce the image intelligence represented thereby.

Viewed from the standpoint of operating modes of the transmitter, a first mode is established during intervals in which the beam of the deflection tube of coder 12 is incident on that segmental anode which extends the video channel to mixer amplifier 13 without introducing any delay. In this first mode, the video components of the television signal may have the normal time relation with respect to the synchronizing components characteristic of commercial telecasting. During alternate operating intervals wherein the beam of the deflection tube impinges upon the remaining segmental anode and consequently introduces a delay into the video channel, the transmitter functions in a second mode. This mode differs from the first in that the video components have a modified or abnormal time relation with respect to the synchronizing components of the television signal. Coding is thus introduced by changing the operating modes of the transmitter in accordance with a coding schedule represented by amplitude variations of the deflection-control signal supplied to coder 12.

In order that the invention may be easily understood, the further operation of the system, with particular regard to the techniques of coding, will be considered initially without any reference to the specific function of key-signal generators 29–32, filters and rectifiers 35–38, transposition switches 55, and multivibrators 39–42. It should be noted at this time that in order to maintain the correct time relationship between the various curves in FIG- URES 2, 3 and 4, FIGURE 3 should be placed immediately below FIGURE 2, and FIGURE 4 below FIGURE 3.

Generator 18 supplies line-drive pulses to gate circuit 43 and, as this gate circuit is normally open, these pulses (curve G) are transmitted therethrough. Binary 44 receives these pulses and, in well-known manner, effects a frequency division of 2:1, as shown in curve H. Thus, for every two line-drive pulses applied to the binary, one pulse appears at its output circuit, the time duration of each resulting pulse being the time elapsed between corresponding portions of any two successive line-drive pulses. The output pulses from binary 44 are then applied to normally open gate circuit 45, and positive- and negative-polarity differentiated pulses which are in time coincidence respectively with positive and negative excursions of the pulses from binary 44 are applied to binary 46. Binary 46 likewise effects a 2:1 frequency division, operating only on the applied negative-polarity pulses, so that the pulses appearing at its output circuit have a time duration equal to the elapsed time between corresponding portions of alternate line-drive pulses, that is, equal to the time duration of two complete line traces, as shown in curve I. Similarly, the output pulses of binary 46 are applied to normally open gate circuit 47 and the negative differentiated pulses produced therein are applied to binary 48. A final frequency division of 2:1 is accomplished therein and the pulses appearing at the output of binary 48 establish a reference count, each pulse having a time duration equal to the elapsed time between every fourth line-drive pulse, namely, equal to the time duration of four complete line traces, as shown in curve J. Consequently, considering gate circuits 43, 45 and 47 as pulse amplifiers for the moment, a total frequency division of 8:1 results and a square wave having a period equal to eight line traces is applied from binary 48 as a control or actuating signal to coder 12. During one-half cycle of this square wave, having a time duration of four line traces, the video components of the television signal have a normal time relation with respect to the synchronizing components and the system functions in its aforedescribed first mode of operation. For the time duration of the next succeeding four line traces which constitute the following half cycle of the square wave applied as a deflection-control signal to coder 12, the video components are delayed with respect to the synchronizing components, thereby establishing the aforementioned second mode of operation. Thus, a faster-than-field coding rate is accomplished with the operating mode changing every four lines and in an uncorrected receiver the reproduced image is displaced in opposite directions at the conclusion of every four lines. Line-drive pulses are also supplied to gate circuit 49 which cooperates with delay line 50 to reset the binary counters from time to time so that the corresponding binary counters in all of the subscriber receivers may be held in step with the transmitter, as will be described more particularly hereinafter. A somewhat similar counting system is disclosed and claimed in copending application Serial No. 291,714, filed June 4, 1952, and issued April 21, 1959, as Patent 2,883,449, by Carl G. Eilers and Erwin M. Roschke, entitled "Subscription Television System" and assigned to the present assignee.

The general effect on the binary circuits, and consequently on the deflection-control wave form supplied to coder 12, caused by random gating pulses applied to the gate circuits may now be considered. As previously indicated, the gate circuits function as pulse amplifiers in the absence of gating pulses; however, in the presence of gating pulses which may be applied to gate circuits 43, 45 and 47 via multivibrators 40–42, the individual gate circuits are closed for the duration of each applied gating pulse.

If any gate circuit is closed at an appropriate time, the count of the next succeeding binary and, hence, the overall count of the chain 43–48 is modified or altered. If the binary is to be actuated by a negative-polarity differentiated pulse but a gating pulse closes the preceding gate circuit during the occurrence of that differentiated pulse, it is prevented from triggering the succeeding binary counter. Therefore, the pulse count of the entire binary system may be altered each time a gating pulse is applied to one of the gate circuits in the binary chain, resulting in a very irregular output wave from unit 48, as will be more completely described hereinafter. Coder 12 may therefore be actuated at a very irregular rate, causing a random number of line traces to be normal and a random number delayed, another random number normal, and then probably still another random number delayed and so forth. The key signals transmitted to all of the subscriber receivers actuate the decoding apparatus at such receivers to restore the delayed line traces to normal so that a completely normal picture image results.

Having briefly described the invention, a more detailed description thereof follows. Attention is directed first to random divider 23, commutator 24 and the key-signal generators which collectively impose an irregular, and preferably a random, count upon the chain counter 43–48.

The line- and field-scansions of device 10 are controlled by sweep systems 20 and 19 which, in turn, are synchronized by line- and field-drive pulses orginating in generator 18. This generator also supplies line-drive pulses, shown in curve A, to random frequency divider 23 which effects a random frequency division thereof to supply the pulses of curve B to the input electrodes of commutator 24. The communtator may be of well-known construction, having a cathode-ray beam developed therein which is modulated by the pulses of curve B. The cathode-ray beam of the commutator is scanned over anode electrodes *28a–28d* by the deflection signal applied to deflection elements 27 from sweep system 26. Frequency divider 25 has a 4:1 division ratio and consequently the sweep frequency of the cathode-ray beam in the commutator is one-fourth the line-frequency of video generator 10. As the commutator beam sweeps anode segments *28a–28d*, it is concurrently modulated by the output signal of divider 23 (curve B).

The individual signal pulses of curve B occur during intervals when the cathode-ray beam impinges on one of the anode segments *28a–28d*. For example, the first pulse of curve B may occur and energize the beam when the sweep signal directs the beam to the lowermost anode segment *28a*. Consequently, a pulse of current flows through the commutator to key-signal generator 32. This current flow kicks or shock-excites signal generator 32 into oscillation in any well-known manner. A positive potential is normally applied to anode segment *28a* and the negative excursion of potential produced by the pulse of commutator current may, for example, be applied to the cathode of generator 32, causing it to oscillate. Thus generator 32 produces a burst of key signal of frequency $f_1$, shown in curve C. In the preferred adaptation of the invention, suitable provision is made to confine the oscillation of each key-signal generator, once excited, to an interval which is of comparable duration with the individual line-synchronizing pulses. For example, a control circuit may be associated with each key-signal generator to provide a suitable oscillation-suppressing signal after an appropriate time delay with respect to the initiating pulse. In this manner, transmission of the key-signal information as discrete bursts of energy superimposed on the line-synchronizing pulses, in a manner to be hereinafter described, is faciliated.

Due to the random frequency division effected by unit 23, the next pulse of curve B may occur when the beam of commutator 24 is directed to the third anode segment 28C to cause key-signal generator 30 to generate a burst of key signal of frequency $f_3$, shown as the second burst of curve C. Likewise, the succeeding pulse of curve B may occur when the beam of commutator 24 is directed to the fourth anode segment 28*d*, thereby causing key-signal generator 29 to generate a burst of key signal of frequency $f_4$. As hereinbefore explained, after each group of four line-drive pulses the sweep cycle of the commutator is repeated, and the next pulse of curve B may cause key-signal generator 32 again to operate and generate a burst of energy of frequency $f_1$. Key-signal generator 31 may be similarly operated by the next succeeding pulse in this sweep of the commutator beam. It should be noted that in view of the random nature of frequency divider 23 no pulse occurs when the beam is directed to anode segment 28*c* or 28*d* during this particular sweep, according to our illustration. In successive sweep cycles the same general process takes place with the actuation of the key-signal generators being determined by the pulse components supplied by random divider 23 during any sweep cycle.

The bursts of key signal from the key-signal generators are supplied to mixer amplifier 13 wherein they are impressed or superposed on the line-synchronizing components in the television signal as shown in curve D. In this manner, key-signal information is transmitted to subscriber receivers to be utilized in a manner to be described. It is, of course, evident that the utilization of the line-synchronizing components to convey key-signal information is immaterial to the inventive concept and that such information may be distributed in whole or in part in other manners, as for example in the form of auxiliary modulation on the sound carrier or by means of a line circuit between transmitter and receiver.

The bursts of key signal from generators 29–32 are delayed in delay line 34, appearing at the output terminals thereof with the time relation shown in curve E. Such delay is provided in order that the bursts are positioned ultimately to control the succeeding line-drive pulses in the binary counting circuit, as will be described hereinafter. The delayed key-signal bursts are selected on a frequency basis and rectified by units 35–38 which trigger multivibrators 39–42 as determined by the setting of transposition switches 55. It should be remembered that according to the setting of the transposition switches 55 each rectifier may be connected to one of the multivibrators; the interconnections are, of course, selected at will and changed frequently, such as at the end of each program. The multivibrators are individually triggered in well-known manner from a stable to an unstable operating condition by an applied rectified burst, and remain in the unstable condition for a selected time interval determined by the multivibrator time constants. The function of the multivibrators is merely to produce pulses in response to the various bursts but each having a duration longer than that of the bursts themselves. In other words, they are employed to widen the pulses transmitted from the rectifiers so that control over the succeeding line-drive pulses may be obtained. Thus, each individual burst of key-signal emanating from delay line 34 (curve E) is channeled through its particular filter and rectifier and over the transposition switches 55 to one of the multivibrators 39–42. A widened pulse is produced for each individual burst of key-signal, the pulses appearing at the output circuits of multivibrators 39–42, as shown in curve F. It should be noted, however, that curve F depicts the combined outputs of the multivibrators, all $f_1'$ pulses appearing at the output of one multivibrator, all $f_2'$ pulses appearing at the output of another one of the multivibrators, $f_3'$ pulses at another and $f_4'$ pulses at still another. The pulses emanating from each of the multivibrators are shown of equal duration, although they may be of different durations so that the output of each multivibrator may have control of the gate circuits for various periods.

The operation of the binary counting system will first be considered without any reference to the specific function of the reset circuit. Simultaneously with the transmission of triggering pulses to multivibrators 39–42, negative polarity line-drive pulses, shown in curve G, are supplied from generator 18 to gate circuit 43. The line-drive pulses are translated by gate circuit 43 whenever gating pulses are not applied thereto. For a particular setting of the transposition switches it may be assumed, for example, that multivibrator 40 is connected by means of the transposition switches to filter and rectifier 35 as illustrated in FIGURE 1*a* and therefore is triggered by rectified key-signal bursts of frequency $f_1$. Multivibrator 40 therefore produces output pulses $f_1'$ (curve F) to actuate gate circuit 43 whenever a key-signal burst of frequency $f_1$ is generated by key-signal generator 32. Gate circuit 43 is therefore closed for the duration of each such gating pulse $f_1'$ in curve F, and, as shown in curve K, no line-drive pulse is supplied to binary 44 during that pulse interval. This action varies the operation of binary 44 with respect to the line-drive pulses since it misses one step each time a gating pulse $f_1'$ occurs. For that reason, the output signal from binary 44 when its gate circuit 43 is taken into account is not regular, as shown in curve H, but has the characteristic shown in curve H'. Viewed differently, the gating function established by pulses $f_1'$ of curve F modifies the input signal actually applied to the counter chain from that represented in curve G to an effective input signal shown in curve K and the response of counter 44 is governed by the amplitude excursions of that effective signal.

As mentioned hereinbefore, gate circuits 45 and 47 are provided with differentiating input circuits to permit closely controlled gating and to provide sharp triggering pulses for the binary counters. Each binary counter is responsive only to triggering pulses of a particular polarity which, for purposes of illustration, has been assumed to be negative; thus, any positive-polarity pulses applied to the binaries may be disregarded as of no effect. Negative-polarity differentiated pulses (which are in time coincidence with the negative excursions of the input pulses) are applied to the gate circuits, and if there are no negative gating pulses applied to cut-off the circuit at the occurrence of any one particular differentiated pulse, are translated therethrough to trigger the succeeding binary counting circuit. However, if a gating pulse is applied to the gate circuit, thereby cutting it off, in time coincidence with a negative-polarity differentiated pulse, that differentiated pulse is prevented from triggering the succeeding binary counter.

Likewise, it may be assumed that multivibrator 41 is connected to filter and rectifier 36 through the transposition switches and closes gate 45 in response to a key-signal burst of frequency $f_2$ from key-signal generator 31. The corresponding gating pulses $f_2'$ of curve F prevent gate circuit 45 from translating any negative-polarity differentiated pulses, derived from the negative amplitude excursions of its input signal (curve H'), occurring within the gating interval. For example, the first such gating pulse $f_2'$ occurs at a time when the input signal (curve H') to gate circuit 45 undergoes a negative amplitude excursion; the resulting negative differentiated pulse therefore, is not translated and the output signal of the gate circuit appears as shown in curve L. It will be noted that the second $f_2'$ pulse occurs at the time the input signal H' to gate circuit 45 undergoes a positive amplitude excursion; consequently, a positive-polarity differentiated pulse is removed from the output (curve L) but this is of no consequence since the succeeding binary is insensitive to applied positive-polarity pulses. Binary 46 is triggered by the negative-pulse components of its applied signal (curve L) and produces an output signal having the wave shape shown in curve I'. It can be seen, therefore, that the application of gating pulses to gate circuit 45 may or may not affect the count of binary 46 depending upon whether or not such pulses occur in time coincidence with a negative amplitude excursion of the signal (curve H') appearing at the output of binary 44. From a comparison of curves I and I', it is apparent that the application of gating pulses to gate circuits 43 and 45 has a considerable effect in producing an irregular wave shape for the coding signal.

In like manner, it may be assumed that multivibrator 42 is connected to filter and rectifier 37 through the transposition switches (FIGURE 1*a*) and supplies a gating pulse to gate circuit 47 whenever key-signal generator 30 generates a key-signal burst of frequency $f_3$. Such gating pulses, shown as $f_3'$ in curve F, have no effect in this particular illustration as they do not occur at times when the input signal to gate circuit 47 (curve I') undergoes a negative amplitude excursion. Binary 48 therefore operates from the output of gate circuit 47 (curve M) and produces an output signal having the wave shape shown in curve J'.

The operation of the counting system with reference to the effect of the reset circuit will now be considered. In order that the binary counters may all be established in a reference condition ($t_0$) at selected intervals, line-drive pulses from generator 18 are supplied thereto through gate circuit 49 and delay line 50. Gate circuit 49 is constructed to interrupt the application of the line-drive pulses to delay line 50 except at times when gating pulses are applied to the gate circuit, which is just opposite to the operation of gate circuits 43, 45 and 47. It may be assumed that filter and rectifier 38 is connected to multivibrator 39 through the transportation switches so that a line-drive pulse is supplied to delay line 50 whenever key-signal generator 29 supplies a key-signal burst of frequency $f_4$ to filter 38. Each time such a burst occurs, shown as $f_4'$ in curve F, a line-drive pulse is passed by the gate circuit (curve N) and is delayed in delay line 50 so as to occur just after any actuation of the binary counters by their input signals, as shown in curve N'. The purpose of this reset pulse, as mentioned hereinbefore, is to establish all the binary counters in a reference condition at the instant of the reset pulse. Specifically, each reset pulse is applied to a particular point in each binary counting circuit in order to trigger each circuit into its reference condition, or to have no effect if already in its reference condition. This arrangement is shown and described in detail in the aforementioned application filed by Carl G. Eilers and Erwin M. Roschke. The output of binary 44 (curve H'') is unaffected by the reset operation (comparing curves H' and H'') for the conditions illustrated as each reset pulse applied to binary 44 finds the circuit already in its reference condition, which is a positive condition occurring at the reset times indicated by vertical lines $t_0$. The output of gate circuit 45 (curve L') is therefore similar to the wave shape in curve L. Binary 46 is also unaffected due to the fact that for the illustrative example each time a reset pulse is applied thereto that circuit is also already in its reference condition. Gate circuit 47 therefore operates in the manner described hereinbefore as is noted from a comparison of curves M' and M. Binary 48, however, being actuated by each of the negative-polarity pulses of curve M', is in a negative condition each time a reset pulse is applied and thus is triggered to its reference positive condition by all three reset pulses in the illustration, as shown in curve J''. It, therefore, may be seen from the wave shape of curve J'' that coder 12 is actuated in a very irregular and random fashion during each field-trace interval.

Although four anode segments 28 are shown associated with commutator 24, any desired number may be used, it being preferable that the number of key-signal generators, filter and rectifier units and transposition switches correspond in each instance to the number of anodes employed. Moreover, any desired number of binary stages may be used in the counting mechanism and, when so desired, the transposition switches 55 may have dummy positions in which the outputs from some of the filter-and-rectifier units are not in use.

The receiver of FIGURE 5 comprises a radio-frequency amplifier 60 having input terminals connected to an antenna 61, 62 and output terminals coupled through a first detector 63 to an intermediate-frequency amplifier 64. Amplifier 64 is connected to a second detector 65 which, in turn, is coupled through a video amplifier 66 to a decoder 67, the output terminals of the decoder being connected to the input electrodes of a cathode-ray image-reproducing device 68. Decoder 67 may be similar to coder 12 at the transmitter, with the polarity of its connections to the binary counter inverted so that it may operate in a complementary fashion to the coder in order effectively to compensate for the previously mentioned variations in the television signal.

Video amplifier 66 is also connected to a synchronizing-signal separator 95 which, in turn, is connected to a field-sweep system 96 and to a line-sweep system 69. The output terminals of sweep systems 96 and 69 are connected to the field-deflection elements 70 and to the line-deflection elements 71 of reproducing device 68. The video amplifier is also connected to a series of filter-and-rectifier units 72–75 which select the afore-described key-signal bursts from the line-synchronizing components. Units 72–75 are respectively connected through delay lines 76–79 and a series of transposition switches 84 to multivibrators 80–83.

Line-sweep system 69 supplies line-synchronizing pulses to a gate circuit 85 and to a gate circuit 86. Gate circuit 85 is connected to a binary counter 87 which, in turn, is connected through a gate circuit 88 to a further binary counter 89. The latter binary is connected through a gate circuit 90 to yet another binary counter 91 which is connected to decoder 67. Gate circuit 86 is connected through a delay line 92 to binary counters 87, 89 and 91 for reset purposes. Multivibrators 80, 81, 82 and 83 are connected to gate circuits 86, 85, 88 and 90 and, depending on the setting of the transposition switches 84, which are preset to correspond with transposition switches 55 at the transmitter, the filters 72–75 may be selectively connected to the multivibrators. Switch setting information is, of course, distributed only to authorized subscribers. Gate circuits 88 and 90 are preferably provided with differentiating input circuits, and phase inverters may be provided as required, as in the case of the corresponding transmitter circuits.

The television signal from the transmitter of FIGURE 1 is intercepted by antenna 61, 62 and amplified in radio-frequency amplifier 60. The amplified television signal is heterodyned to the selected intermediate frequency of the receiver in first detector 63, and the resulting intermediate-frequency signal is amplified in amplifier 64 and detected in second detector 65 to produce a composite video signal. The composite video signal is amplified in video amplifier 66 and supplied to the input electrodes of reproducing device 68 through decoder 67 to control the intensity of the cathode-ray beam in the image reproducer.

The synchronizing components of the composite video signal are separated out by synchronizing-signal separator 95, the field-synchronizing components being used to synchronize field-sweep system 96 and the field scansion of device 68 and the line-synchronizing components being used to synchronize line-sweep system 69 and the line scansion of the reproducer.

Line-synchronizing pulses, or other pulses in fixed phase relation therewith, derived from sweep system 69 are applied to binary counter 87 through gate circuit 85 to produce an actuating signal for binary counter 89 which, in turn, produces an actuating signal for binary counter 91. When the transposition switches 84 are set to identical positions to that of the transposition switches at the transmitter, the gate circuits 85, 86, 88, 90 operate in time coincidence with the operation of the corresponding gate circuits at the transmitter, so that the pulse count of the counting mechanism comprising these binary counters is varied with respect to the line-synchronizing pulses in synchronism with the pulse count variation at the transmitter. The purpose of delay lines 76–79 is to delay the key-signal bursts of curve D to produce bursts in time coincidence with those of curve E so that the gate circuits at the receiver operate in time coincidence with those at the transmitter. In this manner, binary 91 supplies to decoder 67 an actuating signal having amplitude excursions occurring in time coincidence with the amplitude excursions of the actuating signal supplied to coder 12 at the transmitter, so that the decoder is actuated coincidently with the coder thus enabling the receiver to decode and reproduce the subscription signal. It is to be noted that when the transposition switches 84 are properly adjusted, not only are gate circuits 85, 88 and 90 operated in time coincidence with the corresponding gate circuits at the transmitter, but gate circuit 86 is also operated at the proper times so that the counting mechanism at the receiver is also returned to a reference condition whenever the counting mechanism at the transmitter is returned to such condition.

By the use of the aforedescribed instrumentalities precise identity is achieved between the actuation of the decoder at the receiver and the coder at the transmitter, and such actuation proceeds at a faster-than-field rate to produce mode variations at various intervals during each field trace.

By way of summary, the disclosed encoding arrangement for a subscription television system comprises an encoding device, for example, coder 12 in the transmitter or decoder 67 in the receiver, having at least two operating conditions each of which establishes a different operating mode. A pulse counting mechanism, such as binary counting chain 44, 46 and 48 in the transmitter or binary counting chain 87, 89 and 91 in the receiver, is coupled to the encoding device and is responsive to the registration of a predetermined pulse count to effect an actuation of the encoding device from one to another of its operating conditions; in the illustrated embodiments, the binary chains have a basic pulse count of 8:1 so that mode changes are effected at intervals of four line-trace periods each. A pulse-signal source, such as generator 18 in the transmitter or line-sweep system 69 in the receiver, is coupled to the counting mechanism for applying thereto a series of input pulses to be counted. A reset circuit, for example, gate circuit 49 and delay line 50 in the transmitter or gate circuit 86 and delay line 92 in the receiver, is provided for resetting the counting mechanism to a reference condition. Control apparatus, for example, gate circuits 43, 45, 47 in the transmitter or gate circuits 85, 88, 90 in the receiver, is included in the pulse-counting mechanism for varying the count thereof. The system also comprises means for providing a control effect representing a predetermined code schedule; for example, commutator 24 and associated segmental anodes 28*a*–28*d*, and key-signal generators 29–32 provide a control effect representing a predetermined code schedule, preferably random in nature, in the transmitter, and this control effect or key-signal information is derived from the composite video signals at video amplifier 66 in the receiver. Finally, means are provided, such as delay line 34, filter and rectifier circuits 35–38, transportation switches 55, and multivibrators 40–42 in the transmitter, or filter and rectifier circuits 72–75, delay lines 76–79, transposition switches 84, and multivibrators 81–83 in the receiver, for utilizing this control effect to actuate the control apparatus in accordance with the predetermined code schedule; in the illustrated embodiments, the basic pulse count is modified from eight to one in the manner described in connection with the wave form of FIGURES 2–4 to effect mode changes at intervals determined by the code schedule rather than the regular intervals of four line-trace periods each established by the binary chains.

The transmitter embodiment of FIGURE 6 is generally similar to that of FIGURE 1. In this embodiment, random-frequency divider 23 is connected to a single key-signal generator 100, the key-signal generator being connected to mixer amplifier 13. The random frequency divider is also connected to the input electrodes of commutator 24, and generator 18 is connected to supply field-synchronizing pulses to the input terminals of sweep system 27 associated with commutator 24. In this embodiment the anode electrodes 28 of commutator 24 are connected directly to transposition switches 55.

In the embodiment of FIGURE 6, line-drive pulses (shown in curve S of FIGURE 7) are supplied to random frequency divider 23 in which they are randomly frequency-divided to produce the pulse-modulated signal of curve T. The latter signal is supplied to key-signal generator 100 and causes that generator to operate for the duration of each pulse modulation, resulting in a series of key-signal bursts as shown in curve U. These bursts are supplied directly to mixer amplifier 13 to be impressed on the line-synchronizing components of the television signal as shown in curve V.

The cathode-ray beam in commutator 24 is swept across the anode segments once during each field trace due to the energization of sweep system 27 by the field-synchronizing pulses. The circuit is adjusted so that the cathode-ray beam is conditioned to interrupt the anode segments only during selected lines of each field trace, and only if random frequency divider 23 produces a pulse during one of these preselected lines is such pulse translated to the transposition switches. For example, as shown in FIGURE 7, even though the random frequency divider produces the pulses of curve T only the pulses of curve W are supplied to the transposition switches, the other pulses of curve T occurring during intervals when the cathode-ray beam of commutator 24 is not directed to an anode segment. The pulses reaching transposition switches 55 are supplied directly to the gate circuits in accordance with the adjustment of these switches to vary the count of the counting mechanism and to reset that mechanism as described in the previous embodiment. Multivibrators may be interposed between transposition switches 55 and the gate circuits, as in the embodiment of FIGURE 1, if desired.

The receiver of FIGURE 5 is modified in the manner shown in FIGURE 8 to utilize the subscription television signal of the FIGURE 6 embodiment of the transmitter. The receiver of FIGURE 8 includes cathode-ray commutator 115 having its input electrodes connected to a filter-and-rectifier unit 116 which, in turn, is connected to video amplifier 66 to select the key-signal bursts of curve V from the received composite signal. The deflection elements 117 of commutator 115 are controlled by a sweep system 118 which is synchronized by field-synchronizing pulses derived from field-sweep system 96. The anode segments 119 of commutator 115 are connected directly to transposition switches 84 which, in turn, are connected to the various gate circuits included in the counting mechanism.

With the above-described connections, commutator 115 operates in synchronism with commutator 24 at the transmitter so that only pulses corresponding to those utilized to actuate the coder at the transmitter (such as shown in curve W) are supplied to the transposition switches; spurious key-signal bursts corresponding to unused pulses from the output of random frequency divider 23 are intercepted by a passive element of commutator 115. When the receiver switches are preset to a setting identical with that of transposition switches 55 at the transmitter, the pulse count and reset of the transmitter and receiver counting mechanism are identical so that decoder 67 is operated coincidently with the operation of the coder at the transmitter, and the receiver is able to decode and reproduce the subscription signal.

Certain features described in the present application are disclosed and claimed in the copending application Serial No. 700,854, filed December 5, 1957, in the name of Myron G. Pawley et al., constituting a divisional application of copending application Serial No. 230,618, filed June 8, 1951, and issued December 10, 1957, as Patent 2,816,156, assigned to the present assignee.

While the invention has been shown and described by reference to systems in which the gating circuits associated with the pulse counting mechanism are operative to reduce or decelerate the basic count of the binary chain, it is also within the scope of the invention to employ an arrangement in which coding is effected by accelerating the count of one or more stages, or by concurrently accelerating the count of some stages and decelerating that of others. In this connection, the count of any stage of the binary chain may be accelerated by introducing additional trigger pulses at appropriate intervals. In any event, however, it is preferred that the count be modified at random, rather than regular intervals in order to render unauthorized interception and reproduction of the coded signal a practical impossibility.

The invention provides, therefore, an improved subscription television system in which high coding complexity is achieved, and in which the coding process may occur at a faster-than-field rate. Due to the interposition of the transposition switches, the coding schedule may be changed from time to time to increase the flexibility of the system and enhance its secrecy aspect.

While various embodiments of the invention have been shown and described, modifications may be made and it is intended in the appended claims to cover all such modifications as fall within the true spirit and scope of the invention.

I claim:

1. An encoding arrangement for a subscription television system comprising: an encoding device having at least two operating conditions each of which establishes a different operating mode in said system; a pulse-counting mechanism coupled to said encoding device including a selected number of cascade-connected stages and responsive to the registration of a predetermined pulse count to effect an actuation of said encoding device from one to another of its aforesaid operating conditions; a pulse-signal source coupled to said counting mechanism for applying thereto a series of input pulses to be counted thereby; a plurality of control networks respectively associated with said stages of said pulse-counting mechanism and each actuable for varying the count thereof; means for providing a control effect representing a predetermined code schedule; and means for utilizing said control effect to actuate said control networks in accordance with said determined code schedule.

2. An encoding arrangement for a subscription television system comprising: an encoding device having at least two operating conditions each of which establishes a different operating mode in said system; a pulse-counting mechanism coupled to said encoding device comprising a selected number of cascade-connected stages and responsive to the registration of a predetermined pulse count to effect an actuation of said encoding device from one to another of its aforesaid operating conditions; a first pulse-signal source coupled to said counting mechanism for applying thereto a series of pulses to be counted thereby; means for resetting each stage of said counting mechanism to a reference condition from time to time to vary its count; a plurality of control networks respectively associated with said stages of said counting mechanism each responsive to applied pulses for further varying the count of said counting mechanism with respect to the aforesaid pulses from said first pulse-signal source; a corresponding plurality of additional pulse-signal sources; and means for selectively coupling said plurality of additional sources to said control networks.

3. A subscription television transmitter comprising: a signal source for producing a television signal including video components and synchronizing components; a coding device coupled to said source having at least two operating conditions each of which establishes a different operating mode in said transmitter effectively to code said television signal; means for transmitting the coded television signal to subscriber receivers; a pulse-counting mechanism coupled to said coding device including a selected number of cascade-connected stages and responsive to the registration of a predetermined pulse count to effect an actuation of said coding device from one to another of its aforesaid operating conditions; means coupled to the aforesaid signal source for applying said synchronizing components to said counting mechanism to be counted thereby; a plurality of control networks respectively associated with said stages of said counting mechanism and each responsive to an applied pulse for varying the count of said counting mechanism with respect to said synchronizing components; a plurality of pulse-signal networks coupled to said control apparatus for applying pulses thereto; and means for developing at least one key signal bearing information concerning the timing of said last-named pulses.

4. A subscription television receiver for utilizing a television signal coded in accordance with a coding schedule comprising: an image-reproducing device and an associated scanning system; circuit means for supplying said television signal to said reproducing device and scanning system; a decoding device included in said circuit means and having at least two operating conditions each of which establishes a different operating mode in said receiver; a pulse-counting mechanism coupled to said decoding device including a selected number of cascade-connected stages and responsive to the registration of a predetermined pulse count to effect an actuation of said decoding device from one to another of its aforesaid operating conditions; means for deriving a series of pulses from said television signal and for applying said pulses to said counting mechanism to be counted thereby; a plurality of control networks respectively associated with said stages of said counting mechanism and each actuable for varying the count thereof; means for providing a control effect representing a predetermined code schedule; and means for utilizing said control effect to actuate said control networks in accordance with said predetermined code schedule.

5. A subscription television receiver for utilizing a television signal coded in accordance with a coding schedule, and for concurrently utilizing at least one key signal conveying information concerning said coding schedule, comprising: an image-reproducing device and an associated scanning system; circuit means for supplying said television signal to said reproducing device and scanning system; a decoding device included in said circuit means and having at least two operating conditions each of which establishes a different operating mode in said receiver; a pulse-counting mechanism coupled to said decoding device including a selected number of cascade-connected stages and responsive to the registration of a predetermined pulse count to effect an actuation of said decoding device from one to another of its aforesaid operating conditions; means for deriving a series of pulses from said television signal and for applying said pulses to said counting mechanism to be counted thereby; a plurality of control networks respectively associated with said stages of said counting mechanism and each responsive to an applied pulse for varying the count of said counting mechanism with respect to the aforesaid series of pulses; means for utilizing said key signal to derive at least one further series of pulses as established by said coding schedule; and means for selectively applying said last-mentioned pulses to said control networks.

6. A subscription television receiver for utilizing a television signal including video and synchronizing components and coded in accordance with a coding schedule, and for concurrently utilizing a plurality of key signals conveying information concerning said coding schedule, comprising: an image-reproducing device and an associated scanning system; circuit means for supplying said television signal to said reproducing device and scanning system; a decoding device included in said circuit means and having at least two operating conditions each of which establishes a different operating mode in said receiver; a pulse-counting mechanism coupled to said decoding device comprising a selected number of cascade-connected stages and responsive to the registration of a predetermined pulse count to effect an actuation of said decoding device from one to another of its aforesaid operating conditions; means for deriving said synchronizing components from said television signal and for applying said synchronizing components to said counting mechanism to be counted thereby; means for resetting each stage of said counting mechanism to a reference condition from time to time to vary its count; a plurality of control networks respectively included in said stages of said counting mechanism each responsive to applied pulses for further varying the count of said counting mechanism with respect to said synchronizing components; a corresponding plurality of networks responsive respectively to said key signals and each developing a series of pulses; and a transposition mechanim for selectively coupling said last-named plurality of networks to said control networks.

7. A subscription television system comprising: a signal source for producing a television signal including video components and synchronizing components; an encoding device coupled to said source having at least two operating conditions each of which establishes a different operating mode in said system effectively to encode said television signal from said source; a pulse-counting mechanism coupled to said encoding device comprising a selected number of cascade-connected binary counting circuits and responsive to the registration of a predetermined pulse count to effect an actuation of said encoding device from one to another of its aforesaid operating conditions; means coupled to the aforesaid signal source for applying said synchronizing components to said counting mechanism to be counted thereby; control apparatus interposed between at least two of said binary counting circuits and responsive to applied pulses for varying the count of said counting mechanism with respect to said synchronizing components; and at least one pulse-signal source coupled to said control apparatus for applying pulses thereto.

8. An encoding arrangement for a subscription television system comprising: an encoding device having at least two operating conditions each of which establishes a different operating mode in said system; a control mechanism, coupled to said encoding device, having a plurality of stable operating conditions and responsive to a combination of applied signal components for assuming different stable operating conditions to effect actuation of said encoding device between its aforesaid operating conditions in accordance with a code schedule determined by the code pattern represented by said combination of signal components; a first signal source for developing a first series of periodically recurring signal components; a second signal source for developing code signal components individually having a different predetermined identifying characteristic and collectively representing a sub-combination in accordance with a predetermined schedule; and means coupling said first and second sources to said control mechanism to effect actuation thereof between its stable operating conditions in accordance with the combination of signal components conjointly determined by said first and second sources.

9. An encoding arrangement for a subscription television system comprising: an encoding device having a plurality of operating conditions each of which establishes a different operating mode in said system; a multi-stable actuating device coupled to said encoding device for effecting actuation thereof and having at least two stable operating conditions in each of which said encoding device establishes a different operating mode in said system; means including a plurality of input circuits for said actuating device for individually receiving an actuating signal to operate said actuating device from one to another of its aforesaid operating conditions; means for deriving a series of randomly occurring encoding signal components individually having a predetermined different identifying characteristic and collectively determining an encoding schedule; means responsive to said different identifying characteristics for utilizing said encoding signal components to develop a series of different actuating signals respectively corresponding to said different identifying characteristics; and means coupled to said utilizing means and to said input circuits for applying said different actuating signals over said input circuits for effecting actuation of said actuating device between its aforesaid operating conditions to vary the operating condition of said encoding device.

10. An encoding arrangement for a subscription television system comprising: an encoding device having a plurality of operating conditions each of which establishes a different operating mode in said system; an actuating device coupled to said encoding device having at least two stable operating conditions in each of which said encoding device establishes a different operating mode in said system; means including at least two input circuits for said actuating device for individually receiving an actuating signal to operate said actuating device from one to the other of its aforesaid operating conditions; means for deriving a series of encoding signal components individually having a different predetermined identifying frequency and collectively determining an encoding schedule; means responsive to said identifying frequencies for separating said encoding signal components from one another; and means coupled to said input circuits for utilizing the separated signal components to effect actuation of said actuating device between its aforesaid operating conditions for varying the operating condition of said encoding device.

11. A subscription television transmitter for transmitting a coded television signal comprising: a coding device having a plurality of operating conditions each of which establishes a different operating mode in said transmitter; a multi-stable actuating device coupled to said coding device for effecting actuation thereof and having at least two stable operating conditions in each of which said coding device establishes a different operating mode in said transmitter; a plurality of input circuits for said actuating device for individually receiving an actuating signal to operate said device from one to another of its aforesaid operating conditions; a series of signal generators; means for controlling the operation of said generators to establish a series of coding signal components representing a coding schedule determined by the appearance of said components within said series; and means coupled to said input circuits for utilizing said coding signal components to effect actuation of said actuating device between its aforesaid operating conditions for varying the operating condition of said coding device.

12. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a pulse-signal source coupled to said counting mechanism for applying thereto a predetermined number of input pulses to effect said prescribed count registration; means for developing a series of encoding signal components individually having an assigned one of several predetermined identifying characteristics; selecting means coupled to said developing means for selecting only those encoding signal components that exhibit a particular one of said identifying characteristics; and means coupled to said selecting means for utilizing each of the selected encoding signal components to reset said counting mechanism to a reference condition.

13. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals dependent upon the registration of a preselected count by said counting mechanism; a pulse-signal source coupled to said counting mechanism for applying thereto a predetermined number of input pulses to effect said prescribed count registration; means for developing a series of encoding signal components individually having an assigned one of several predetermined identifying frequencies; selecting means including an adjustable switching mechanism for selecting only those encoding signal components that exhibit a particular one of said identifying frequencies as determined by the instantaneous adjustment of said switching mechanism; and means coupled to said selecting means for utilizing each of the selected encoding signal components to reset said counting mechanism to a reference condition.

14. In a television receiving system, the combination of: a sound receiving channel adapted to demodulate and deliver at respective output terminals a sound signal, a first control tone and a second control tone, said control tones falling outside the range of said sound signal; an electrical counting circuit having a plurality of count indicating output terminals which conditionally deliver electrical signals upon the attaining of predetermined counts in said counting circuit, said counting circuit also having a driving signal input terminal and a reset signal input terminal; signal coupling means connected from said first and said second control tone output terminals to said driving signal input terminal and reset signal input terminals respectively; a television video signal visual reproducing means; a picture garbling circuit connected with said last named means and having an input terminal, to which signals may be applied to control said garbling circuit; and signal coupling means connected from at least one of said indicating output terminals to said garbling circuit input terminal.

15. In a television receiving system, the combination of:

a receiving channel adapted to demodulate and deliver at respective output terminals a first control signal and a second control signal each of which has a predetermined different identifying frequency;

an electrical counting circuit having a count indicating output terminal which conditionally delivers an electrical signal upon the attaining of predetermined counts in said counting circuit, said counting circuit also having a driving signal input terminal and a reset signal input terminal;

signal coupling means connected from said first and second control signal output terminals to said driving signal input terminal and reset signal input terminal respectively;

a television video signal visual reproducing means;

a picture garbling circuit connected with said reproducing means and having an input terminal, to which signals may be applied to control said garbling circuit;

and signal coupling means connected from said count indicating output terminal to said garbling circuit input terminal.

16. In a television receiving system, the combination of:

a receiving channel adapted to demodulate and deliver at respective output terminals a first series of driving signal components and a second series of reset signal components, the components of at least one of said series comprising signal bursts of a predetermined identifying frequency;

an electrical counting circuit having a count indicating output terminal which conditionally delivers an electrical signal upon the attaining of predetermined counts in said counting circuit, said counting circuit also having a driving signal input terminal and a reset signal input terminal;

signal coupling means connected from said driving signal and reset signal output terminals to said driving signal and reset signal input terminals respectively;

decoding apparatus;

and signal coupling means connected from said count indicating output terminal to said decoding apparatus to control the operation thereof.

17. In a television receiving system, the combination of:

a receiving channel adapted to demodulate and deliver at respective output terminals a first series of driving signal components and a second series of reset signal components, the components of at least one of said series comprising signal bursts of a predetermined identifying frequency and occurring at random;

an electrical counting circuit having a count indicating output terminal which conditionally delivers an electrical signal upon the attaining of predetermined counts in said counting circuit, said counting circuit also having a driving signal input terminal and a reset signal input terminal;

signal coupling means connected from said driving signal and reset signal output terminals to said driving signal and reset signal input terminals respectively;

decoding apparatus;

and signal coupling means connected from said count indicating output terminal to said decoding apparatus to control the operation thereof.

18. In a subscription television system:

an encoding device having a plurality of operating conditions each of which establishes a different operating mode in said system;

a multi-stable actuating device coupled to said encoding device having a plurality of stable operating conditions, at least some of which are effective to establish said encoding device in assigned ones of its aforesaid operating conditions;

at least two input circuits included in said actuating device and individually differently responsive to an actuating signal to operate said actuating device from one to another of its aforesaid stable operating conditions;

means for deriving a combination of randomly occurring encoding signal components individually having a predetermined different identifying frequency and collectively determining a code schedule;

and means coupled to said deriving means and to said input circuits for utilizing said encoding signal components to control the application of actuating signals to said input circuits for effecting actuation of said actuating device between its aforesaid stable operating conditions to vary the operating condition of said encoding device.

19. An encoding arrangement for a subscription television system comprising:

an encoding device having at least two operating conditions each of which establishes a different operating mode in said system;

a control mechanism, coupled to said encoding device, having a plurality of stable operating conditions and responsive to a combination of applied signal components for assuming different stable operating conditions to effect actuation of said encoding device between its aforesaid operating conditions in accordance with a code schedule determined by the code pattern represented by said combination of signal components;

a first signal source for developing a first series of periodically recurring signal components;

a second signal source for developing randomly occurring code signal components individually having a predetermined different identifying frequency and collectively representing a sub-combination in accordance with a predetermined schedule;

and means coupling said first and second sources to said control mechanism to effect actuation thereof between its stable operating conditions in accordance with the combination of signal components conjointly determined by said first and second sources.

References Cited in the file of this patent

UNITED STATES PATENTS

| | | |
|---|---|---|
| 2,472,774 | Mayle | June 7, 1949 |
| 2,539,556 | Steinberg | Jan. 30, 1951 |
| 2,570,188 | Aram et al. | Oct. 9, 1951 |
| 2,636,936 | Goldsmith | Apr. 28, 1953 |
| 2,656,407 | Herrick et al. | Oct. 20, 1953 |
| 2,757,226 | Zworykin | July 31, 1956 |